United States Patent

[11] 3,537,498

[72] Inventor Elmer F. St. Amand
 North Hollywood, California
[21] Appl. No. 767,356
[22] Filed Oct. 14, 1968
[45] Patented Nov. 3, 1970
[73] Assignee American Hospital Supply Corporation
 Evanston, Illinois
 a corporation of Illinois

[54] THERMOPLASTIC BOTTLE FOR STERILE MEDICAL LIQUIDS
 7 Claims, 9 Drawing Figs.

[52] U.S. Cl. .................................................. 150/.5,
 215/1, 215/100, 220/72, 220/94
[51] Int. Cl. ...................................................... B65d 1/02,
 B65d 23/10
[50] Field of Search .......................................... 215/100,
 100(A), 1.5; 150/.5; 248/359, 360; 220/94(A), 72;
 222/465, 466, 180

[56] References Cited
UNITED STATES PATENTS

| | | | |
|---|---|---|---|
| 2,768,667 | 10/1956 | Hill.............................. | 150/.5 |
| 3,043,461 | 7/1962 | Glassco ....................... | 150/.5X |
| 3,215,299 | 11/1965 | Coanda ....................... | 215/100 |
| 3,384,258 | 5/1968 | Singier ........................ | 215/100 |
| 3,387,732 | 6/1968 | Jellies.......................... | 215/100 |

FOREIGN PATENTS

| | | | |
|---|---|---|---|
| 691,320 | 7/1964 | Canada ....................... | 215/1.5 |

Primary Examiner—Donald F. Norton
Attorneys—Larry N. Barger and Robert T. Merrick ABSTRACT: A generally rectangular plastic bottle for storing and dispensing sterile medical liquids, which bottle is strengthened about its midsection by thickened indented wall sections which permit the bottle to have thin, generally transparent wall portions and still be grasped without tending to materially change the internal volume of the bottle.

Patented Nov. 3, 1970

INVENTOR
ELMER F. ST. AMAND
BY
Larry N. Barger
ATTORNEY

Patented Nov. 3, 1970
3,537,498
Sheet 2 of 3
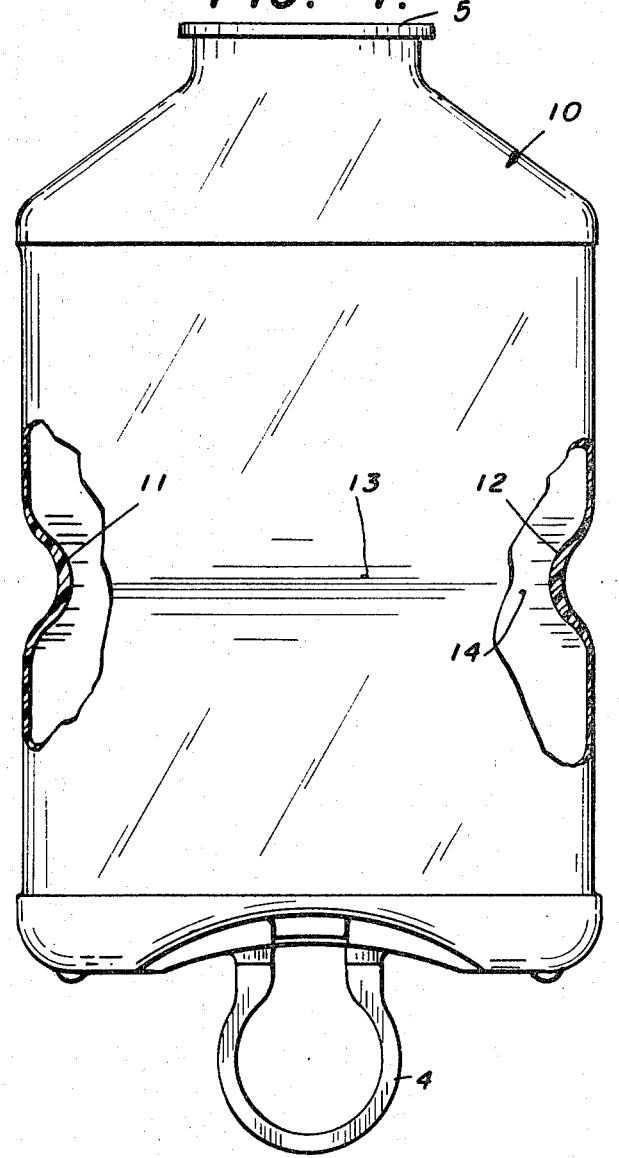
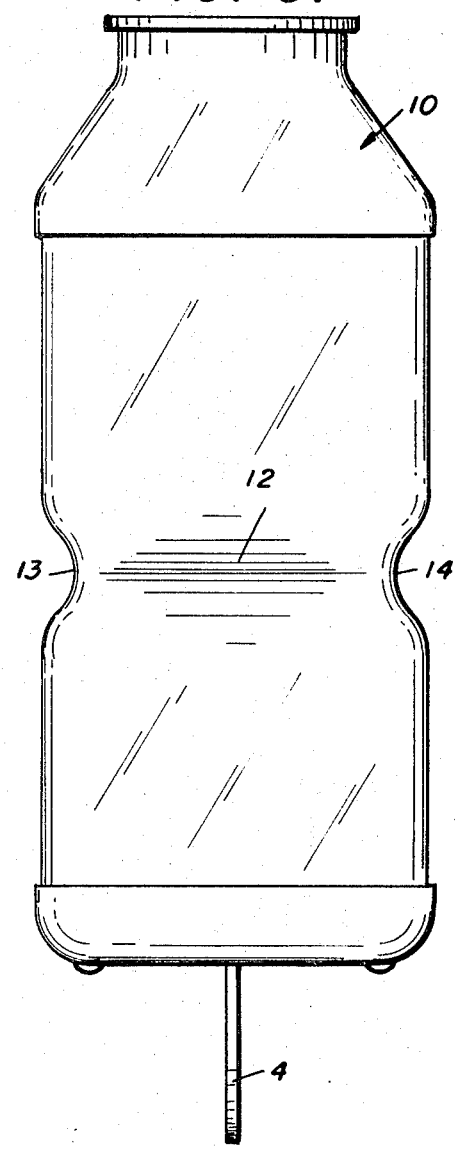
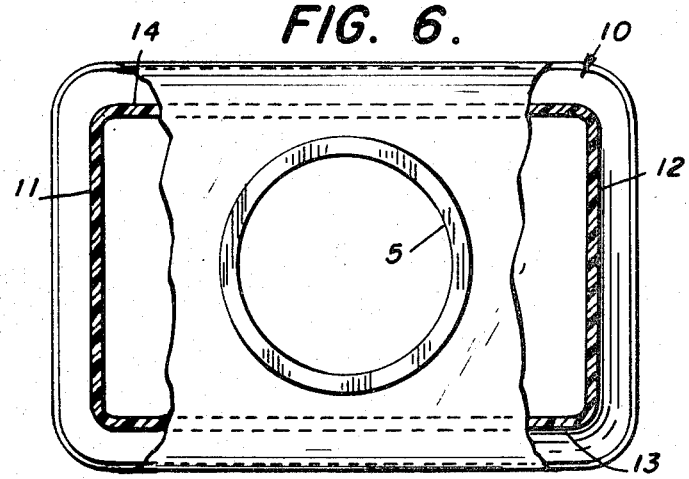
INVENTOR
ELMER F. ST. AMAND
BY
Larry N. Barger
ATTORNEY

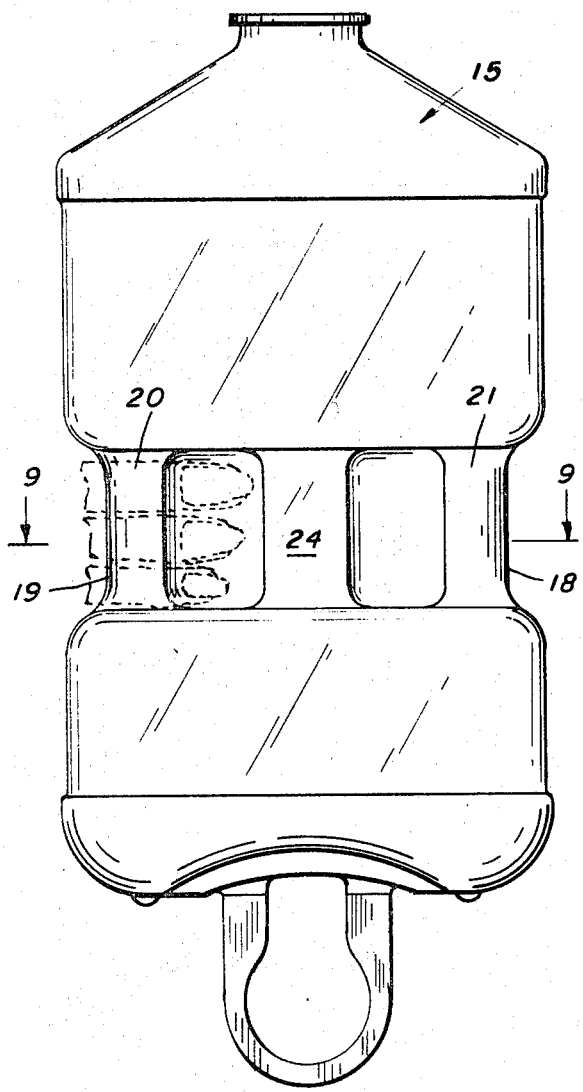
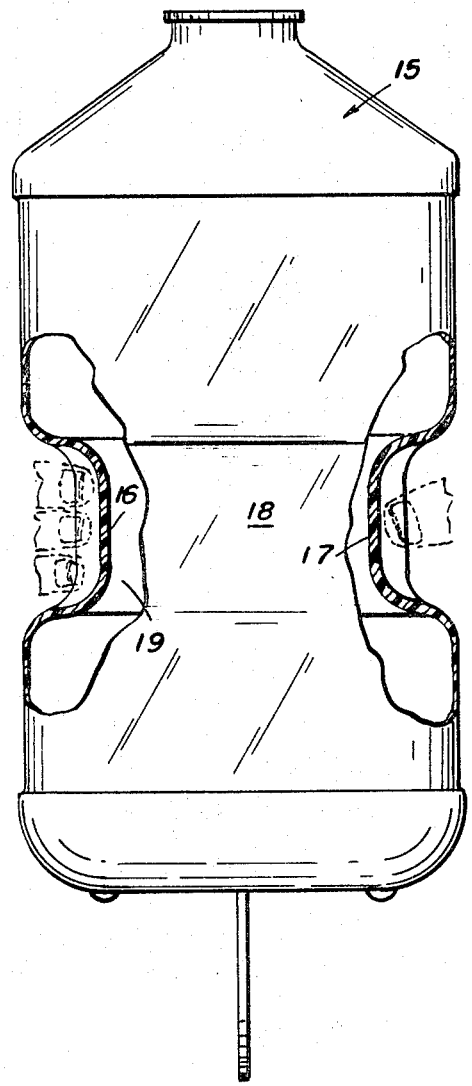
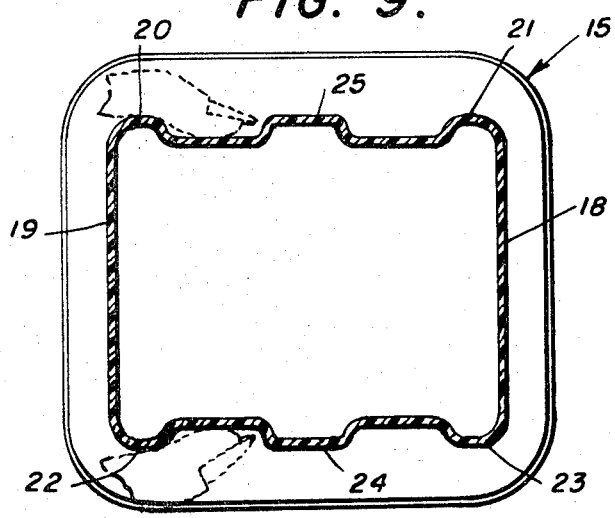
INVENTOR
ELMER F. ST. AMAND
BY
Larry N. Barger
ATTORNEY

THERMOPLASTIC BOTTLE FOR STERILE MEDICAL LIQUIDS

This invention relates to a thermoplastic bottle for storing and dispensing sterile intravenous solutions and sterile irrigating solutions.

Thermoplastic bottles for these medical liquids have been proposed previously to overcome the disadvantages of glass bottles, namely their high weight and ease of breakage. One such thermoplastic bottle is described in U.S. Pat. No. 3,215,299.

The thermoplastic bottle described in this patent was filled with liquid, sealed, steam sterilized, and then stored until ready for use. This generally rectangular bottle had one particular problem. The flat side walls which were kept very thin to increase their transparency would flex inwardly when the bottle was grasped, thus tending to cause the bottle's internal volume to decrease. After the bottle was opened, this could cause liquid from the bottle to gush out of its top, destroying the sterility of the liquid as it contacted a nonsterile outer surface on the bottle or the operator's hand.

Such a flexure problem can easily be remedied in bottles for soaps, household cleaners, etc., which do not have to be transparent and do not have to be sterilized. The entire walls can be increased in thickness to rigidify them. However, the thermoplastics which withstand sterilization temperatures of 220°F. to 260°F. tend to become increasingly cloudy as their thicknesses are increased. It is important for the walls of a sterile medical liquid bottle to be kept as thin as possible and hence generally transparent so a nurse or physician can view the sterile liquid contents. The operator needs to see the liquid contents to be sure there are no unwanted precipitates, etc. in the liquid immediately before administering it to a patient.

I have overcome this disadvantage in previous thermoplastic bottles for sterile liquids by providing wall sections that are at least 10 percent thicker at a midsection of the container. These thickened wall sections curve inwardly to create lateral channels across the bottle which greatly reduce the wall flexure when it is handled. Other portions of the walls remain relatively thin for reasons of transparency. This construction also improves the structural rigidity of the bottle so it can better withstand the rigors of steam sterilization without excessive flexure.

Three embodiments of this invention are shown in the drawings, in which:

FIG. 4 is a front elevational view partially in section of a second embodiment of the invention;

FIG. 5 is a side elevational view of FIG. 4;

FIG. 6 is a top plan view partially in section of FIG. 4;

FIG. 7 is a side elevational view of a third embodiment of the invention;

FIG. 8 is a front elevational view partially in section of FIG. 7; and

FIG. 9 is a sectional view taken along line 9—9 of FIG. 8.

Figure 1:
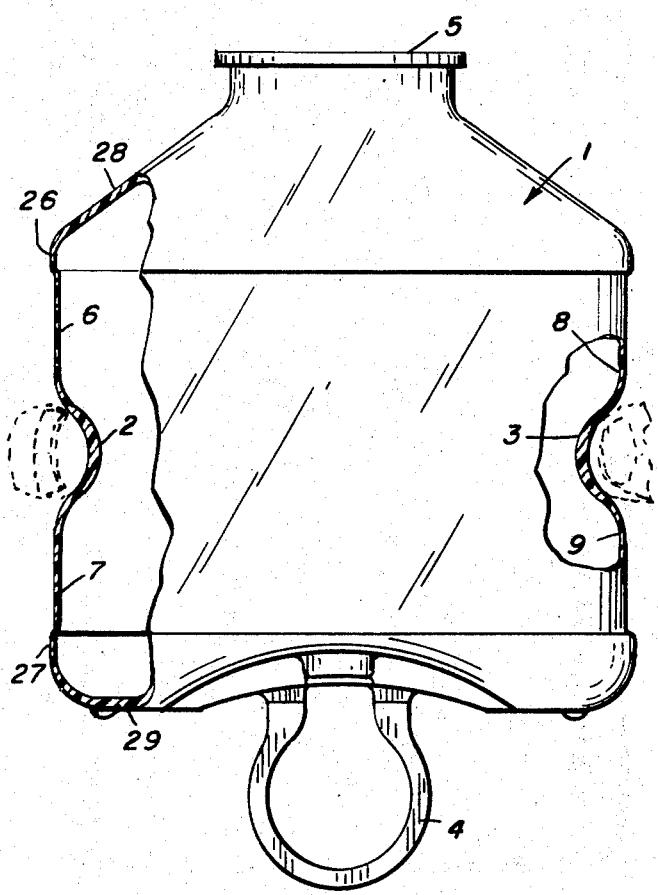
FIG. 1 is a front elevational view partially in section of a first embodiment of the invention.
Figure 2:
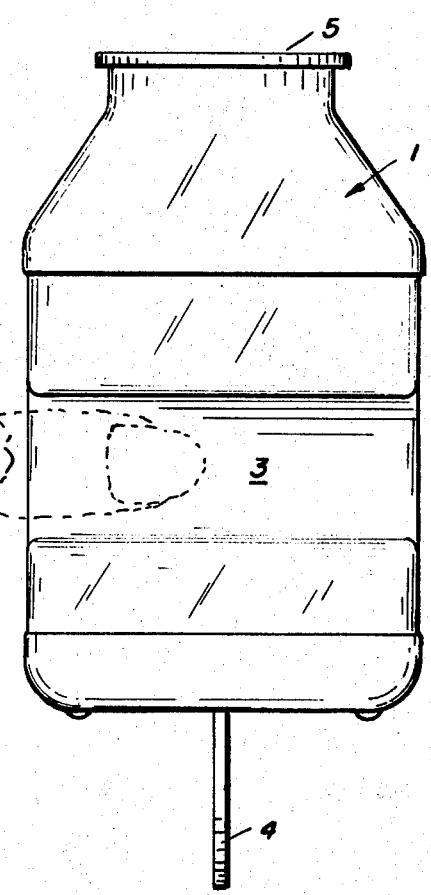
FIG. 2 is a side elevational view of FIG. 1.
Figure 3:
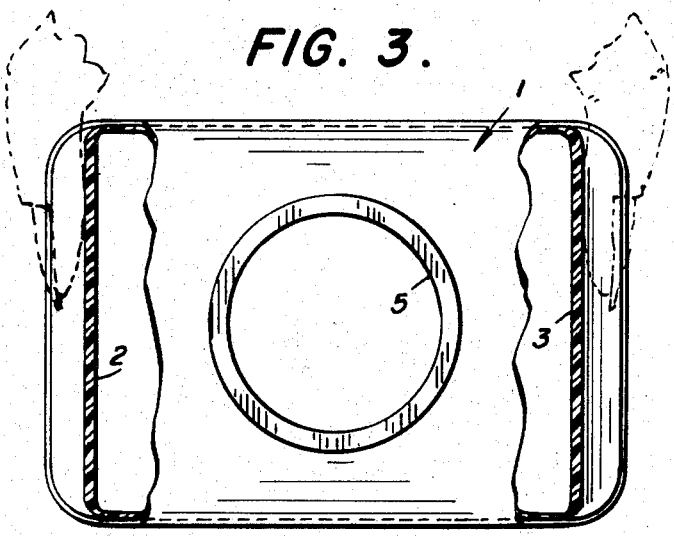
FIG. 3 is a top plan view partially in section of FIG. 1.

The bottles shown in the three embodiments are all suited for storing and dispensing sterile medical liquids. The embodiment of FIGS. 1—3 works well for a bottle of ½- liter size; the FIGS. 4—6 embodiment does well in 1- and 2-liter sizes, and finally the third embodiment, FIGS. 7—9 is designed for large volumes such as 4-liters. All of these bottles are of a thermoplastic that will withstand steam sterilization of 220°F. to 260°F., and all are required to be generally transparent so an operator can view the liquid contents. Unfortunately, the thermoplastic materials which will withstand the high sterilizing temperatures are polyolefins such as polyethylene, polypropylene and copolymers of polyethylene and polypropylene. These polyolefins are generally transparent in only very thin wall sections and become increasingly cloudy as the wall sections thicken. At wall thicknesses where the material is generally transparent, bottles of these materials have a problem of wall flexure which can change the internal volume of the bottles when grasped.

Referring to the first embodiment (FIGS. 1—3), the flexure problem is greatly minimized by the following structure of container 1. Container 1 has an indented bottom with an integrally attached hanger 4 used to hang the bottle upside down for dispensing through an outlet 5. The container 1 also has thickened side wall sections 2 and 3 which are between 10 percent and 50 percent thicker than the adjacent wall portions 6, 7, 8 and 9 and curve inwardly in an arc to create channels where the bottle can be conveniently grasped. Thus, inward pressure of the thumb and forefinger is exerted on the thickened wall sections which are more resistant to inward flexure. In these thickened channel sections of the container transparency has been sacrificed somewhat for the purpose of reducing wall flexure. However, above and below these thickened sections liquid can be viewed through thin, generally transparent planar wall portions 6, 7, 8 and 9, which are between .020 and .050 inch thick. Also supporting these thin, generally transparent wall portions are top and bottom walls 28 and 29, which are substantially thicker than wall portions 6, 7, 8 and 9. To keep these wall portions 6, 7, 8 and 9 from excessively scraping against each other during shipping, and causing scratches and decreased clarity, outwardly extending scuff ribs 26 and 27 at upper and lower portions of the bottle have been provided.

In the second embodiment (FIGS. 4—6), the bottle 10 is for larger volumes of 1- and 2-liters. Here, both the side wall and the front and back walls have thickened wall sections 11, 12, 13 and 14 which are 10 percent to 50 percent thicker than the adjacent wall portions, which wall portions are .020 to .050 inch thick. These thickened wall sections also curve inwardly and provide an indented channel completely encircling the bottle. This gives added structural rigidity to the bottle because thickened wall sections 13 and 14 across the front and back walls provide a transverse bracing effect when the side walls are grasped at their thickened wall sections 11 and 12, as in FIG. 4.

The third embodiment of FIGS. 7—9 has a container 15 with indented wall sections 16, 17, 18 and 19 which are 10 percent to 50 percent thicker than adjoining wall portions. This 4-liter container, when filled with liquid, is heavy so the thickened wall sections have been indented over a wide span whereby an operator can get several fingers in the indented area for firm control. To aid in giving him a better grip on the bottle, the thickened side walls have raised vertical corner ribs 20, 21, 22 and 23 at each end of thickened wall sections 16 and 17. Raised vertical ribs 24 and 25 between these corner ribs add strength to the thickened wall sections. All of these ribs are thicker than adjacent wall portions and have outer surfaces which are spaced inwardly from adjacent wall portions above and below the vertical ribs.

Here, as in the second embodiment, there are four wall sections that are 10 percent to 50 percent thicker than the .020 to .050 inch adjacent wall portions. For large size bottles of 1-, 2- and 4-liter sizes, it is necessary for the thickened wall sections to completely encircle the bottles to give rigidity about a midsection of the bottle. A large liquid filled container being heavier than a small container has to withstand a greater grasping pressure by an operator when handled.

In all of the embodiments shown, the perimetric indentations have been found to produce a high degree of structural rigidity in the bottles despite the relatively thin flexible plastic material from which such bottles are formed. The application of a distorting force against the side of such a bottle must be sufficient to cause an indentation to first assume a double curvature before any appreciable deformation of the side wall can occur. Resistance to forces which might impose such a double curvature is high because such a change would require simultaneous stretching and compressing of adjacent areas of the indented wall portions and because of the increased wall thickness of such wall portions.

In the foregoing specification, I have described my invention using specific embodiments. However, persons skilled in the art can make certain modifications to these embodiments without departing from the spirit and scope of the invention.

I claim:

1. A steam sterilizable bottle for medical liquids formed of a flexible, generally transparent plastic material, which bottle includes a substantially rigid top with an outlet and a substantially rigid bottom; said bottle being substantially of a rectangular shape in a transverse dimension; a first set of two opposed walls having thickened midwall sections forming indented channels that extend transversely in a generally parallel manner across midsections of these walls to ends of the other walls, which indented channels oppose each other and are spaced apart such a distance to be readily graspable between a thumb and finger of a human hand; an upper portion of the bottle between the indented channels and the top outlet being free of a carrying handle so that it is natural for a person to grasp the bottle at the indented channels and the hand is oriented well below the bottle's outlet and approximately at its center of gravity when the bottle is filled with sterile medical liquid; the bottle having thin flexible, generally transparent panels above and below the indented channels for inspecting contents of the bottle; and a second set of opposed walls having central wall sections that provide approximately straight line, generally parallel bracing structures which intersect and rigidify the indented channels against inward distortion when the bottle is grasped in these channels adjacent corner edges of the bottle.

2. A bottle for medical liquids as set forth in claim 1, wherein the bracing wall sections of the second set of opposed walls also include indented, generally parallel channels thereacross joining with the indented channels of the first set of opposed walls.

3. A bottle for medical liquids as set forth in claim 1, wherein the bottle has outwardly protruding scuff ribs at upper and lower portion of its walls.

4. The structure as claimed in claim 1 in which said channels thickened wall sections are at least 10 percent greater in thickness than said adjacent thinner generally transparent panels and form a structural reinforcement for orienting a user's hand to attain balance, preventing collapse of the bottle, preventing one's hand from approaching the outlet to insure sterile integrity of the medical fluid being poured.

5. The structure as claimed in claim 1 in which said channels are substantially concave-convex in section and are joined to adjacent walls by generally radiused edges, the central portion of said channels being substantially thicker than adjacent walls and being essentially crescent shaped in section.

6. A steam sterilizable bottle for medical liquids formed of flexible plastic material; said bottle including a top, a bottom, and being substantially of a rectangular shape in a transverse dimension with thin, generally transparent opposed side walls and opposed front and back walls; each of said walls having wall sections forming indented channels extending transversely across their midsections to provide a channel means completely encircling the bottle's midsection, which channels have a vertical span sufficiently wide to accommodate a plurality of human fingers; said wall sections being 10 percent to 50 percent thicker than adjacent portions of the walls, whereby these wall sections rigidify the bottle and reduce inward deflection of the walls when the bottle is grasped at these channels; and at least one raised vertical rib connected to each thickened side wall section.

7. A bottle for medical liquids as set forth in claim 6, wherein the thickened side wall sections each have three raised vertical ribs with two of these ribs being at corners where the thickened side wall sections join the thickened front and back wall section, all of said ribs having outer surfaces indented from outer surfaces of wall portions above and below the thickened wall sections.